May 19, 1959 B. J. WARMAN 2,887,617

TELEPHONE AND LIKE SIGNALLING SYSTEMS

Filed Nov. 26, 1956 2 Sheets-Sheet 1

May 19, 1959 B. J. WARMAN 2,887,617

TELEPHONE AND LIKE SIGNALLING SYSTEMS

Filed Nov. 26, 1956 2 Sheets-Sheet 2

2,887,617

Patented May 19, 1959

2,887,617

TELEPHONE AND LIKE SIGNALLING SYSTEMS

Bloomfield James Warman, Charlton, London, England, assignor to Siemens Edison Swan Limited, London, England, a British company Application November 26, 1956, Serial No. 624,435

Claims priority, application Great Britain November 25, 1955

3 Claims. (Cl. 315—84.6)

Figure 1:
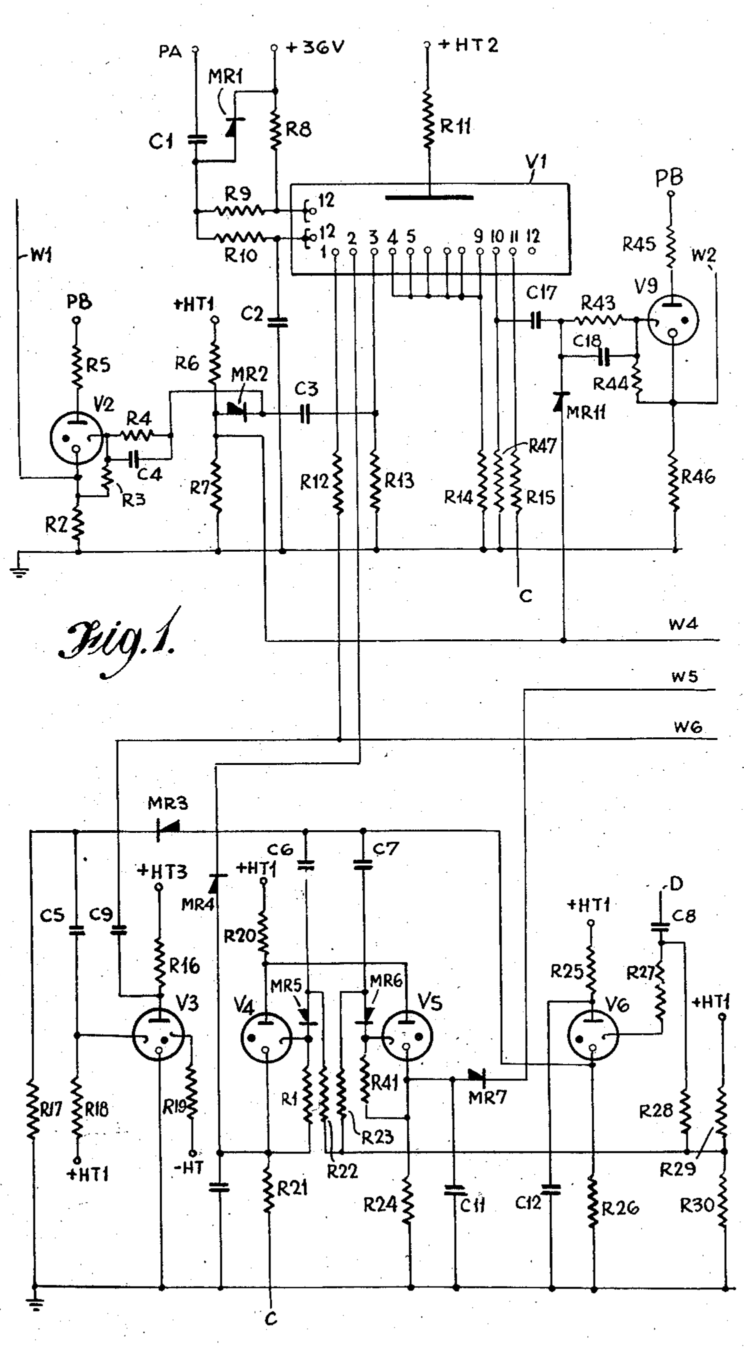

This invention relates to telephone and like signalling systems, and more particularly to means in such systems for effecting control of an electronic switching circuit employing cold cathode gas-filled electric discharge tubes by digital current or voltage impulses transmitted to the switching circuit over a transmission line external to the switching circuit.

The cold cathode discharge tubes employed in electronic switching circuits generally comprise at least two main electrodes and a so-called striker electrode. As is well known, once such a tube has been brought to a conducting condition the striker electrode becomes ineffective for controlling the condition of the tube and the tube must be extinguished by means other than the removal of the stimulus from the striker electrode.

One well known circuit design technique which enables cold cathode gas-filled discharge tubes once struck, to be extinguished when required, is the so-called "pulsed anode" technique. According to this technique pulses are applied to the anodes of the tubes to be controlled, the amplitude of the pulses being such that only upon the application to the striker electrode of a suitable triggering potential which is coincident with a positive anode pulse can a tube be brought to conduction, and so long as the triggering potential is applied, the tube will conduct only during the application of each positive anode pulse. The anode pulses may be positive direct current pulses, or suitable amplitude alternating current pulses, of low frequency, e.g. between 50 and 500 cycles per second.

In the case of an electronic switching circuit employing cold cathode gas-filled discharge tubes using the "pulsed anode" technique described above and which has to respond to digital current or voltage impulses transmitted to the circuit over an external transmission line, difficulties arise due to the fact that these impulses are not synchronised in any way with the anode pulse supply, and means have to be provided to ensure that for each received impulse a single corresponding pulse coincident with a positive pulse of said anode pulse supply is produced within the said switching circuit, and to avoid the possibility of any clipped pulses being produced as a result of the technique employed.

In telephone and like signalling systems, trains of digital current or voltage impulses are used to convey information from one point of a system to another, consecutive impulse trains being separated from one another by a time interval which is sufficiently longer than the time intervals between the individual impulses of a train to enable the end of a train of impulses to be readily detected by timing means in the circuit receiving the impulses. With such signalling arrangements, if the switching circuit which the impulses control is one using cold cathode discharge tubes employing the "pulsed anode" technique, not only is it necessary for the timing device to determine the end of each impulse train but it is also necessary to ensure that the actions performed by the timing device when it effects the necessary discrimination shall be coincident with a single positive pulse of the anode pulse supply provided for the discharge tubes in the switching circuit. Again, with signalling arrangements as described above, the release of the circuit receiving the impulses is brought about by a prolonged disconnection of the impulsing circuit. This necessitates the provision of a further timing device to discriminate between the relatively short disconnections of the impulsing circuit which represent the individual impulses and the longer disconnection which indicates that the circuit receiving the impulses is to be restored to normal. If the last-mentioned circuit is one employing cold cathode discharge tubes in which the "pulsed anode" technique is used, it is necessary to arrange that the actions performed by the further timing device to denote a release condition shall also be coincident with a single positive pulse of the anode pulse supply provided for the relevant discharge tubes.

The present invention has as its main object the provision of an improved electronic control circuit, for use with an electronic switching circuit employing cold cathode discharge tubes arranged for "pulsed anode" operation, that is responsive to impulses received over an external transmission line and that ensures that each impulse received over this line is repeated to the electronic switching circuit as a pulse coincident with a single positive anode pulse supplied to cold cathode discharge tubes in said switching circuit, and in which the actions performed by timing devices which determine the end of an impulse train and the release condition each occur at a time which is coincident with a single positive anode pulse supplied to the cold cathode discharge tubes in said switching circuit.

According to a main feature of the present invention, an electronic control circuit for bringing about the giving of an indication of a change of condition in an impulsing circuit over an external transmission line includes a pulse counting device and a signal transmitting cold cathode gas-filled electric discharge tube using the "pulsed anode" technique hereinbefore defined, the pulse counting device having a marking position in which it produces a triggering voltage for triggering the signal transmitting tube to cause this tube to give said indication, and the operation of the pulse counting device and the signal transmitting tube being dependent upon pulses from local sources arranged and connected so that pulses are delivered to the pulse counting device at times when no pulse is delivered to the signal transmitting tube and vice versa, and the time taken to operate the pulse counting device to said marking position on receipt of a signal responsive to the pertinent change of condition of the impulsing circuit to be indicated being less than the duration of the said change of condition, and the pulse counting device on being set to said marking position serving to produce said triggering voltage for a period coincident with a positive pulse delivered to the anode of the signal transmitting tube.

According to another feature of the invention, an electronic control circuit for bringing about the giving of indications of changes of condition in an impulsing circuit over an external transmission line, different indications being given in respect of changes of condition having different significances, includes first and second pulse counting devices and a plurality of signal transmitting cold cathode gas filled electric discharge tubes using the "pulsed anode" technique hereinbefore defined, each pulse counting device on being set to a marking position serving to produce a triggering voltage for triggering one said signal transmitting tube, individual to the marking position, to cause this tube to give a said indication, and the operation of the pulse counting devices and the signal transmitting tubes being dependent upon pulses from local sources arranged and connected so that pulses are delivered to the two pulse counting devices simultaneously and at times when no pulses are delivered to the signal transmitting tubes and vice versa, and the first pulse counting device operating as a counter during the time the impulsing circuit is open and having two marking positions, and the time taken to operate the first pulse counting device to the pertinent one of its two marking positions on receipt of a signal responsive to a significant opening of the impulsing circuit being less than the obtaining duration of the open condition of the impulsing circuit, and the second pulse counting device operating as a counter during the time the impulsing circuit is closed and having a single marking position, and the time taken to operate the second pulse counting device to the marking position on receipt of a signal responsive to the closure of the impulsing circuit being less than the interval between the end of one impulse train and the beginning of the next, and each pulse counting device on being set to a marking position serving to produce the requisite triggering voltage for a period coincident with a positive pulse delivered to the anode of the signal transmitting tube individual to the marking position.

According to a further feature of the invention, an electronic control circuit for bringing about the giving of indications of changes of condition in an impulsing circuit over an external transmission line, different indications being given in respect of changes of condition having different significances, includes first and second pulse counting devices and a plurality of signal transmitting cold cathode gas-filled electric discharge tubes using the "pulsed anode" technique hereinbefore defined, the first pulse counting device having a first marking position and a second marking position and the second pulse counting device having one marking position, and each pulse counting device on being set to a marking position serving to produce a triggering voltage for triggering one said signal transmitting tube, individual to the marking position, to cause this tube to give a said indication, and the operation of the pulse counting devices and the signal transmitting tubes being dependent upon pulses from local sources arranged and connected so that pulses are delivered to the two pulse counting devices simultaneously and at times when no pulses are delivered to the signal transmitting tubes and vice versa, and the receipt of a signal responsive to the opening of the impulsing circuit starting the counting operation of the first pulse counting device from its starting position and preventing the operation of the second pulse counting device beyond its starting position, and the receipt of a signal responsive to the closure of the impulsing circuit starting the counting operation of the second pulse counting device from its starting position and preventing the operation of the first pulse counting device beyond its starting position, and the time taken by the first pulse counting device to count to its first marking position being less than the break period of an impulse received over the impulsing circuit and the time taken by this device to count to its second marking position being longer than the break period of such an impulse, and the time taken by the second pulse counting device to count to its marking position being less than the interval between the end of one impulse train received over the impulsing circuit and the beginning of a succeeding train, and each pulse counting device on being set to a marking position serving to produce the requisite triggering voltage for a period coincident with a positive pulse delivered to the anode of the signal transmitting tube individual to the marking position.

In the contemplated embodiments of the invention according to the last-mentioned feature, the two marking positions of the first pulse counting device are spaced so that the first will be attained during the break period of an impulse received over the impulsing circuit and the second position will be attained when the impulsing circuit is opened for a prolonged break period indicative of a release condition. The marking position of the second pulse counting device may be a position corresponding to the second marking position of the first pulse counting device and will be attained only during the prolonged make period of the impulsing circuit indicative of the pause between two successive impulse trains.

The pulse counting devices may conveniently be multi-cathode gas-filled electric discharge tubes of the kind in which a discharge is caused to move from one operative cathode to the next, in an order in which the operative cathodes are arranged, under the influence of negative pulses applied to auxiliary cathodic electrodes (guides).

To hold the discharge in such a tube at a starting position for counting purposes, a cathode early in the direction of traverse of the discharge within the tube may have an inhibiting potential applied to it to hold the discharge on the preceding cathode.

The signals indicative of a change of condition of the impulsing circuit may take the form of pulses delivered, one on the occurrence of each such change, to control apparatus associated with the pulse counting devices and with the signal transmitting tubes. The break period of an impulse will then be signalled as two pulses separated by an interval equal to the break period, and the end of an impulse train will be recognised by the longer duration between the last signal pulse of a pair and the first signal pulse of a succeeding pair, and the release condition will be recognised by the fact that a signal pulse analogous to the first signal pulse of a pair is not followed by the complementary second signal pulse. These signal pulses may take effect on electronic equipment in the control apparatus associated with the pulse counting devices, and serve inter alia to control a bi-stable trigger circuit arranged to apply an inhibiting potential to an early cathode of one or the other, depending upon which of its two stable conditions the trigger circuit is in, of the pulse counting devices to hold the discharge in the relevant pulse counting device at a starting position.

Figure 1A:
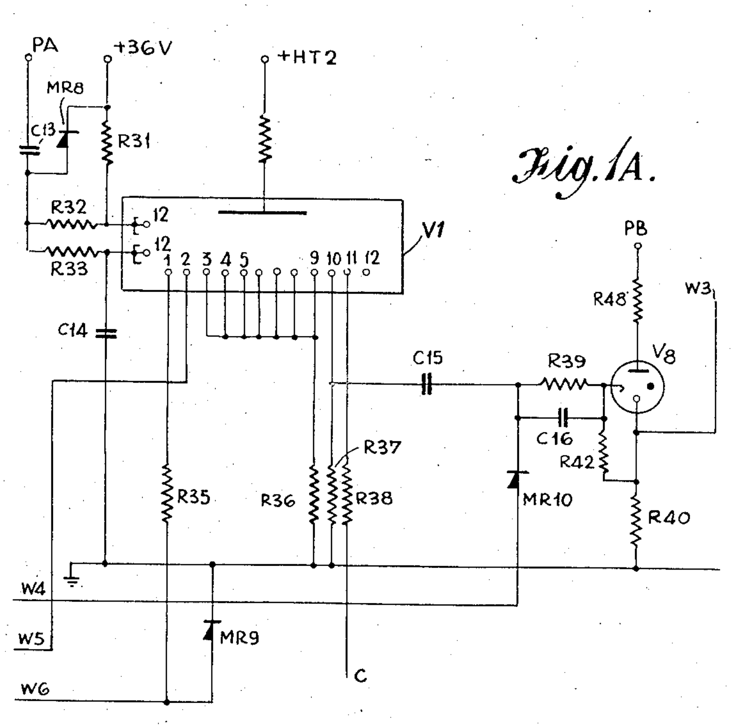
Figure 2:
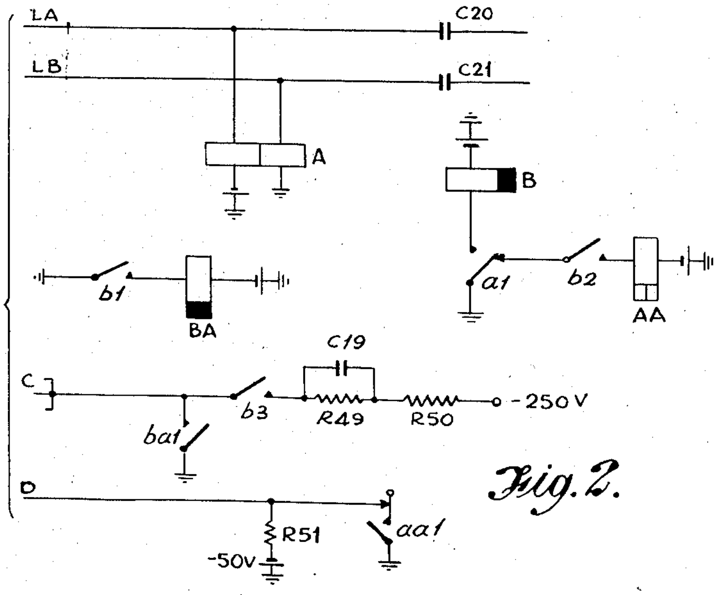

By way of example, a specific embodiment of the invention will now be described with reference to the accompanying drawings. In the case of this embodiment, the improved electronic control circuit according to the invention takes the form of a register control circuit for an automatic telephone system. In use, this register control circuit is interposed between a relay set and an electronic register-translator equipment, the relay set being one in which dialled digits are received in the form of trains of impulses constituted by interruptions of a calling loop, and the electronic register-translator equipment being of a type employing cold cathode gas-filled electric discharge tubes using the "pulsed anode" technique. Except for the fact that the electronic register-translator equipment is of a type employing cold cathode discharge tubes using the "pulsed anode" technique, the particular constitution and organization of this equipment does not concern the present invention, and no illustration of this equipment is included in the drawings. The register control circuit serves to couple the relay set to the electronic register-translator equipment in a manner which provides for the requisite control of the register-translator equipment in accordance with the loop signals received in the relay set, the control signals transmitted from the register control circuit to the register-translator equipment being timed to have the necessary coincidence with a positive anode pulse supplied to cold cathode discharge tubes in the register translator equipment. Figs. 1 and 1A of the drawings together constitute a circuit diagram of the register control circuit, and Fig. 2 is a circuit diagram showing those circuit elements of the relay set which are concerned in the control of the register-translator equipment through the medium of the register control circuit. In considering Figs. 1 and 1A, the two figures should be placed side by side with Fig. 1A to the right of Fig. 1 and with the wires W4, W5, and W6 in Fig. 1A in line with the respective corresponding wires in Fig. 1.

The relay set illustrated (so far as certain essential circuit elements are concerned) in Fig. 2 is similar to circuits known in connection with electromagnetic switching systems. It includes an impulse receiving relay A, a high speed impulse repeating relay AA, a slow releasing release control relay B, an auxiliary slow releasing relay BA, two incoming wires LA and LB, two outgoing wires C and D, and two line capacitors C20 and C21. The relay set is taken into use when the incoming wires LA and LB are looped over a calling loop in known manner. The outgoing wires C and D are connected to the register control circuit associated with the relay set. The wire C provides a path over which a setting signal is transmitted to set the register control circuit in readiness to receive pulses and the wire D provides a path over which pulses are transmitted to the register control circuit.

Wire D is normally held at a potential of −50 volts by the connection over resistor R51. When the incoming wires LA and LB are looped, relay A operates and contact *a*1 operates relay B. Contact *b*1 operates relay BA, contact *b*2 prepares an operating circuit for relay AA and contact *b*3 initiates the setting signal on wire C. The setting signal potential which is initially −250 volts (applied over resistors R50 and R49) rises towards earth in a time determined by the time constant of the resistance-capacity combination constituted by capacitor C19, and resistor R49. When contact *ba*1 closes the setting signal is clamped to earth potential. The potential of the setting signal is arranged in the manner just described to ensure that when it is clamped to earth no transients are introduced to disturb the setting of the various cold cathode gas-filled electric discharge tubes in the register control circuit, as would happen if the setting signal was changed suddenly from −250 v. to earth potential.

Upon the receipt of the first break impulse of an impulse train, relay A releases and relay AA operates and owing to the make-before-break action of the contact *aa*1, earth potential is momentarily applied to the pulse wire D causing a short duration earth pulse to be transmitted thereover. At the end of the first break impulse relay A re-operates and relay AA releases, and again owing to the make-before-break action of the contact *aa*1, this time during the restoration of the contact to normal, a further earth pulse is transmitted over the pulse wire D. Similarly, for each subsequent break impulse received over the incoming wires LA and LB two short duration earth pulses, one at the start of a received break impulse and the other at the end of it, are transmitted over the pulse wire D to the register control circuit.

The register control circuit illustrated in Figs. 1 and 1A includes two multi-cathode gas-filled electric discharge tubes V1 and V7, a bi-stable trigger circuit consisting of two three-electrode cold cathode gas-filled electric discharge tubes V4 and V5 and associated circuits, one self-extinguishing three-electrode cold cathode gas-filled electric discharge tube V6, one self-extinguishing pre-ionised four-electrode cold cathode gas-filled electric discharge tube V3, and three three-electrode cold cathode gas-filled electric discharge tubes V2, V8 and V9 to which the "pulsed anode" technique is applied and which are hereinafter referred to as signal transmitting tubes. The cathode of each of the signal transmitting tubes has an outgoing signal wire connected to it; wire W1, which is connected to the cathode of tube V2, provides a path (to digit storage devices within the register-translator) over which trains of pulses representing digits are transmitted; wire W3, which is connected to the cathode of tube V8, provides a path over which a selecting signal is transmitted to a distributor circuit (within the register-translator) which determines which digit storage device shall receive a train of pulses representing a particular digit; and wire W2, which is connected to the cathode of tube V9, provides a path to the register-translator for a release signal. The register control circuit is fed with low-frequency driving pulses from two local sources, positive pulses which are designated PA (and which are applied to the terminals so designated) from a first source being applied to the multi-cathode tubes V1 and V7, and positive pulses which are designated PB (and which are applied to the terminals so designated) from the second source being applied to the signal transmitting tubes V2, V8, and V9. The frequency of the driving pulses may be for example 50 pulses per second. The pulses PA from the first source may have a ratio of "on" to "off" of 2:1, and the pulses PB from the second source may have a ratio of "on" to "off" of 1:2, the "on" period of each source coinciding with the "off" period of the other. The register control circuit is connected to sources of high tension voltages suitable for the proper operation of the cold cathode gas-filled electric discharge tubes employed, the terminals designated +HT1, +HT2, and +HT3 being connected to be maintained respectively at three different positive voltages with respect to earth, and the terminal designated −HT being connected to be maintained at a negative voltage with respect to earth. The pre-ionising circuit of tube V3 is completed over a resistor R19.

When the register control circuit is taken into use, the setting signal from the relay set is received on the wires C (Fig. 1) of this control circuit, which are connected to wire C (Fig. 2) of the relay set, and is applied to cathode 11 of each of the multi-cathode tubes V1 and V7 to cause the glow in each of these tubes to invest cathode 11, and is also applied to the cathode of the three-electrode tube V4 in the bi-stable trigger circuit, to strike this tube of the bi-stable pair V4 and V5.

The pulses received by the register control circuit from the relay set over wire D are applied via capacitor C8 and resistor R27 to the trigger (striker electrode) of tube V6. There also exists on the trigger of this tube a standing bias potential which is obtained via resistors R27 and R28 from the potential present at the junction of resistors R29 and R30. Consequently, the repeated pulse-plus-bias condition on the trigger of tube V6 causes this tube to strike upon the application of each pulse to its trigger. The tube V6 has a self-extinguishing circuit comprising resistor R25 and capacitor C12 associated with it, this circuit being arranged so that the capacitor C12 discharges through the tube when the tube strikes and thereby provides part of the discharge-maintaining current for the tube, and so that after the capacitor C12 has discharged the tube depends on the current flowing from its anode supply terminal HT1 via resistor R25 for its continued conduction but because resistor R25 is of high value the current passed by this resistor is insufficient to maintain conduction through the tube and consequently the tube is extinguished and capacitor C12 thereupon re-charges via resistor R25 (from the supply connected to terminal HT1) in readiness for the next time the tube strikes.

The positive pulse which is developed across the cathode resistor R26 when tube V6 strikes is applied to one side of each of the capacitors C5, C6, and C7, the application to capacitor C5 being by way of rectifier MR3, and the resulting pulse through capacitor C5 strikes tube V3 since the trigger (striker electrode) to which the pulse is applied is already biased via resistor R18 from the supply connected to terminal HT1. When tube V3 strikes, the consequent fall in its anode potential due to capacitor C9 discharging through it and to the presence of anode resistor R16 causes a negative pulse to be applied via capacitor C9 to cathode 1 of each of the multi-cathode tubes V1 and V7 to bring their glows onto the respective cathodes 1. The capacitor C9 and resistor R16 comprise a self-extinguishing circuit for tube V3 similar in form to that already described in connection with tube V6.

The first positive pulse from the cathode of tube V6, resulting from the beginning of a break impulse received in the relay set, when applied to capacitors C6 and C7, effects a change over of the bi-stable trigger circuit. Both of the tubes V4 and V5 have their triggers (striker electrodes) held at a standing bias potential which is obtained (via resistors R22 and R23 respectively) from the potential present at the junction of resistors R29 and R30, so that on the application to the trigger of tube V5 of the pulse via capacitor C7 this tube strikes thereby lowering the anode potential of tube V4 so that this latter tube is extinguished. Resistors R1 and R41 are provided as leak resistors to disperse any charge left on the trigger of either of tubes V4 and V5 when the tube is extinguished. When tube V5 strikes, the resulting rise of potential at its cathode is applied via rectifier MR7 and wire W5 to cathode 2 of tube V7 to prevent the glow of this tube from being advanced from cathode to cathode under the influence of the driving circuit of the tube. Since cathode 2 of the other multi-cathode tube V1 has no such inhibiting potential applied to it for the time being the glow in this latter tube is advanced one complete step, i.e. from one cathode to the next cathode, at each PA pulse. The driving circuits of the multi-cathode tubes are arranged and operate in a manner which will now be described with reference to the driving circuit of multi-cathode tube V1. A positive (PA) pulse is applied to two voltage divider chains. One voltage divider chain consisting of two equal resistors R9 and R8 applies half the pulse amplitude to the first guides of the tube V1. The second guides of the tube V1 are fed from a quasi-integrating network, consisting of resistor R10 and capacitor C2, which causes the leading and trailing edges of the pulse to have a delayed exponential fall and rise respectively. Thus at the termination of the input PA pulse the first guides immediately become the most negative electrode and receive the glow. The potential on the second guides falls at a rate determined by the resistance capacity combination constituted by capacitor C2 and resistor R10 to a value more negative than the first guides so that the glow again transfers. After the end of the input PA pulse, the first guides quickly return to their bias voltage, and shortly afterwards the voltage on the second guides similarly changes. The glow then invests the following cathode, completing one step forward. The guides are returned to +36 volts bias, and a clamping rectifier MR1 prevents this value from being exceeded as a result of the action of the coupling capacitor C1.

When the glow in the multi-cathode tube V1 invests cathode 3, the pulse developed across resistor R13 is applied via capacitor C3 and resistor R4 to the biased trigger (striker electrode) of the signal transmitting tube V2, causing tube V2 to strike since a PB pulse is present on its anode at the time. The resulting pulse at the cathode of tube V2, due to the presence of the cathode resistor R2, is transmitted over wire W1 to a digit storage device within the register-translator. The resistor R3 which is connected between trigger and cathode of tube V2 is to provide a leak path for the charge remaining on the trigger when the tube has extinguished, and the capacitor C4 which is connected in parallel with the trigger resistor R4 allows a sharply rising pulse to be applied initially to the trigger to effect a fast striking of the tube. The pulse transmitted over wire W1 coincides with a PB pulse, and is accordingly correctly timed to have the necessary coincidence with a positive anode pulse (also a PB pulse) supplied to cold cathode discharge tubes in the register-translator.

The glow in the multi-cathode tube V1 is advanced along the cathodes of this tube in the manner described until a second pulse on wire D, defining the end of the break impulse received by the relay set, again causes tube V6 to strike and produce a further output pulse at its cathode. This output pulse at the cathode of tube V6 is applied via capacitor C6 to the trigger (striker electrode) of tube V4 to effect a further change-over of the bi-stable trigger circuit, thereby causing the inhibiting potential on cathode 2 of the multi-cathode tube V7 to be removed and a similar inhibiting potential to be applied via rectifier MR4 to cathode 2 of the multi-cathode tube V1. The said output pulse at the cathode of tube V6 is also applied via capacitor C5 to re-strike the tube V3 and thereby effect the restoration of the glow in tube V1 to cathode 1. For the time being the glow in the multi-cathode tube V7 is advanced one complete step, i.e. from one cathode to the next cathode, at each PA pulse.

The arrangement of the register control circuit is such that if the second pulse received on wire D from the relay set as just referred to is followed by a further pulse on this wire derived from the same impulse train as the said second pulse, then before there has been time for the glow in the multi-cathode tube V7 to be stepped as far as cathode 10 the said further pulse brings about the striking of tubes V6 and V3 and the changing-over of the bi-stable trigger circuit to the condition in which tube V5 is conducting and V4 is extinguished. Upon such striking of tubes V6 and V3 and changing over of the bi-stable trigger circuit, the glow in the multi-cathode tube V7 is brought onto the cathode 1, the inhibiting potential on cathode 2 of the tube V1 is removed, and the inhibiting potential is applied, via rectifier MR7 and wire W5, to cathode 2 of the multi-cathode tube V7, as will be clear from the description already given. The glow in the multi-cathode tube V1 is thereupon for the time being advanced one complete step at each PA pulse, a pulse being transmitted over wire W1 by the signal transmitting tube V2 when the glow invests cathode 3. This advance of the glow in the tube V1 continues until a still further pulse on wire D, defining the end of the pertinent break impulse received by the relay set, again causes tube V6 to strike, and so on.

When the pulse defining the end of the last break impulse of an inpulse train received by the relay set is received on wire D, this pulse brings about, in the manner previously described, the striking of tubes V6 and V3 and the changing-over of the bi-stable trigger circuit to the condition in which V4 is conducting and V5 is extinguished. Upon such striking of tubes V6 and V3 and changing-over of the bi-stable trigger circuit, the glow in the multi-cathode tube V1 is brought onto the cathode 1, the inhibiting potential on cathode 2 of the multi-cathode tube V7 is removed, and the inhibiting potential is applied, via rectifier MR4, to cathode 2 of tube V1, as will be clear from the description already given. The glow in the multi-cathode tube V7 is thereupon for the time being advanced one complete step at each PA pulse. In the case now being considered, there is time (since the pulse on wire D is the last pulse on this wire in respect of the impulse train concerned) for the glow in the multi-cathode tube V7 to be stepped as far as cathode 10 before any further pulse appears on wire D. When the glow in tube V7 invests cathode 10, the pulse developed across resistor R37 is applied via capacitor C15 and resistor R39 to the biased trigger (striker electrode) of the signal transmitting tube V8, causing tube V8 to strike since a PB pulse is present on its anode at the time. The resulting pulse at the cathode of tube V8, due to the presence of the cathode resistor R40, is transmitted over wire W3 to a distributor circuit within the register-translator to bring about requisite operation thereof. If further digits have still to be received and registered in the register-translator, such operation of the distributor circuit brings about the operative association of the wire W1 with another digit storage device within the register-translator in praparation for the registration of the succeeding digit. The resistor R42 which is connected between trigger and cathode of tube V8, and the capacitor C16 which is connected in parallel with the trigger resistor R39, correspond respectively to the resistor R3 and capacitor C4 associated with tube V2. The pulse transmitted over wire W3 coincides with a PB pulse, and is accordingly correctly timed to have the necessary coincidence with a positive anode pulse (also a PB pulse) supplied to cold cathode discharge tubes in the register-translator.

When the impulse receiving relay in the relay set (Figure 2) releases in response to a continued opening of the calling loop constituting the release condition, the register control circuit initially responds to the resulting pulse on wire D in the same way as it responds to the first pulse received on wire D in respect to a break impulse received in the relay set. Thus the said resulting pulse on wire D brings about the striking of tubes V6 and V3 and the changing-over of the bi-stable trigger circuit to the condition in which V5 is conducting and V4 is extinguished. Upon such striking of tubes V6 and V3 and changing-over of the bi-stable trigger circuit, the glow in the multi-cathode tube V7 is brought onto the cathode 1, the inhibiting potential on cathode 2 of the multi-cathode tube V1 is removed, and the inhibiting potential is applied, via rectifier MR7, to cathode 2 of tube V7, as will be clear from the description already given. The glow in the multi-cathode tube V1 is thereupon advanced, at the rate of one complete step per PA pulse, until it reaches the end cathode. This is because in the case now being considered no further pulse is received on wire D in time to bring about the stopping of the advance of the glow in tube V1 before cathodes 10 and 11 and 12 are reached. When the glow in tube V1 invests cathode 10, the pulse developed across resistor R47 is applied via capacitor C17 and resistor R43 to the biased trigger (striker electrode) of the signal transmitting tube V9, causing V9 to strike since a PB pulse is present on its anode at the time. The resulting pulse at the cathode of tube V9, due to the presence of the cathode resistor R46, is transmitted over wire W2 to initiate the release of the relevant apparatus within the register-translator. The resistor R44 which is connected between trigger and cathode of tube V9, and the capacitor C18 which is connected in parallel with the trigger resistor R43, correspond respectively to the resistor R3 and capacitor C4 associated with tube V2. The pulse transmitted over wire W2 coincides with a PB pulse, and is accordingly correctly timed to have the necessary coincidence with a positive anode pulse (also a PB pulse) supplied to cold cathode discharge tubes in the register-translator.

What I claim is:

1. An electronic control circuit, for bringing about an indication of a change of condition in an impulsing circuit over an external transmission line, including a pulse counting device having a starting position and a marking position, a signal transmitting cold cathode gas-filled electric discharge tube having at least an anode and a cathode and a striker electrode, said signal transmitting tube using the pulsed anode technique, a connection connecting said pulse counting device to a first local pulse source for supplying to this counting device pulses for effecting counting operation thereof and a connection connecting said signal transmitting tube to a second local pulse source for supplying to this transmitting tube the positive anode pulses employed in said pulsed anode technique, the pulses supplied by said first pulse source having the same pulse recurrence frequency as but occurring in the intervals between the pulses supplied by said second pulse source, means responsive to a signal produced by the pertinent change of condition of said impulsing circuit for causing said pulse counting device to count, starting from said starting position, upon such change, the time taken for counting operation to advance this counting device from said starting position to said marking position being less than the duration of said change of condition, means coupling said signal transmitting tube to said pulse counting device and operative upon the setting of said pulse counting device to said marking position to apply to said striker electrode, for a period coincident with a positive anode pulse supplied by said second pulse source, a triggering voltage for triggering said signal transmitting tube into conduction, and an outgoing signal wire connected to said cathode of said signal transmitting tube on which a signal condition giving said indication is produced, for a period coincident with a positive anode pulse supplied by said second pulse source, by the conduction of said signal transmitting tube.

2. An electronic control circuit, for bringing about indications of changes of condition in an impulsing circuit over an external transmission line, the changes of condition being constituted by the opening and closure of the impulsing circuit and different indications being given in respect of changes of condition having different significances, including a first pulse counting device having a starting position and first and second marking positions, a second pulse counting device having a starting position and a marking position, for and individual to each of said marking positions of said pulse counting devices a signal transmitting cold cathode gas-filled electric discharge tube having at least an anode and a cathode and a striker electrode, said signal transmitting tube using the pulsed anode technique, for each of said pulse counting devices a connection connecting the device to a first local pulse source for supplying to the device pulses for effecting counting operation thereof and for each of said signal transmitting tubes a connection connecting the tube to a second local pulse source for supplying to the tube the positive anode pulses employed in said pulsed anode technique, the pulses supplied by said first pulse source having the same pulse recurrence frequency as but occurring in the intervals between the pulses supplied by said second pulse source, means responsive to a signal produced by the opening of said impulsing circuit for causing said first pulse counting device to begin counting starting from its starting position and said second pulse counting device to be brought to and to be held at its starting position and means responsive to a signal produced by the closure of said impulsing circuit subsequent to an opening thereof for causing said second pulse counting device to begin counting starting from its starting position and said first pulse counting device to be brought to and to be held at its starting position, the time taken for counting operation to advance said first pulse counting device from its starting position to its first marking position being less than the period of opening of said impulsing circuit which constitutes a digital impulse and the time taken for counting operation to advance said first pulse counting device from its starting position to its second marking position being longer than such a period and the time taken for counting operation to advance said second pulse counting device from its starting position to its marking position being longer than the period of closure of said impulsing circuit which occurs between consecutive digital impulses of a train but less than the period of closure of said impulsing circuit which occurs between consecutive trains of digital impulses, for each said signal transmitting tube means coupling the tube to the pulse counting device to which it pertains and operative upon the setting of this counting device to the marking position to which the tube pertains to apply to the striker electrode of the tube, for a period coincident with a positive anode pulse supplied by said second pulse source, a triggering voltage for triggering the tube into conduction, and for each said signal transmitting tube an outgoing signal wire connected to said cathode of the tube on which a signal condition giving a said indication is produced, for a period coincident with a positive anode pulse supplied by said second pulse source, by the conduction of the tube.

3. An electronic control circuit according to claim 2 wherein each of said first and second pulse counting devices comprises a multi-cathode gas-filled electric discharge tube of the kind provided with means whereby a discharge is caused to move from one operative cathode to the next, in an order in which the operative cathodes are arranged, in response to pulses applied to an input circuit of the tube, and wherein said means responsive to a signal produced by the opening of said impulsing circuit and said means responsive to a signal produced by the closure of said impulsing circuit subsequent to an opening thereof comprise in common a bistable trigger circuit controlled to be set to one of its two stable conditions responsive to a said signal produced by the opening of said impulsing circuit and to be set to the other of its two stable conditions responsive to a said signal produced by the closure of said impulsing circuit subsequent to an opening thereof and operative in one of its said two stable conditions to apply an inhibiting potential to an early operative cathode of said second pulse counting device to hold the discharge in this device at the starting position and operative in said other of its two stable conditions to apply an inhibiting potential to an early operative cathode of said first pulse counting device to hold the discharge in this device at the starting position.

References Cited in the file of this patent

UNITED STATES PATENTS

| | | |
|---|---|---|
| 2,664,555 | Thomas et al. | Dec. 29, 1953 |
| 2,696,572 | Schmid | Dec. 7, 1954 |